United States Patent [19]

Yamazaki et al.

[11] Patent Number: 5,235,871
[45] Date of Patent: Aug. 17, 1993

[54] BICYCLE OPERATING LEVER ASSEMBLY

[75] Inventors: Toshimasa Yamazaki; Mitsuo Nishimura, both of Sakai, Japan

[73] Assignee: Maeda Industries, Ltd., Osaka, Japan

[21] Appl. No.: 703,749

[22] Filed: May 21, 1991

[30] Foreign Application Priority Data

Oct. 3, 1990 [JP] Japan .................................. 2-267405

[51] Int. Cl.⁵ .................................................. B62K 21/12
[52] U.S. Cl. ................................... 74/551.8; 74/551.9
[58] Field of Search ................. 74/551.1, 551.8, 551.9; 280/278, 279, 288.4

[56] References Cited

U.S. PATENT DOCUMENTS

| | | | |
|---|---|---|---|
| 581,260 | 4/1897 | Biddle | 74/551.9 |
| 599,564 | 2/1898 | Kintner | 74/551.9 |
| 605,626 | 6/1898 | Blanchard, Jr. | 74/551.9 |
| 1,448,921 | 3/1923 | Ershkowitz | 74/551.8 |
| 4,354,399 | 10/1982 | Katayama | 74/551.1 |
| 4,445,396 | 5/1984 | Shimano | 74/551.9 X |
| 4,462,267 | 7/1984 | Shimano | |
| 4,750,754 | 6/1988 | Lennon | 74/551.8 X |
| 4,878,397 | 11/1989 | Lennon | 74/551.1 |
| 4,930,798 | 6/1990 | Yamazaki et al. | 74/551.8 X |
| 4,951,525 | 8/1990 | Borromeo | 74/551.8 X |
| 5,000,469 | 3/1991 | Smith | 74/551.9 X |
| 5,033,325 | 7/1991 | Giard, Jr. | 74/551.8 X |
| 5,094,322 | 3/1992 | Casillas | 74/551.8 X |
| 5,138,893 | 8/1992 | Copeland | 74/551.8 X |

FOREIGN PATENT DOCUMENTS

| | | |
|---|---|---|
| 9105274 | 8/1991 | Fed. Rep. of Germany . |
| 953453 | 12/1949 | France . |
| 1539632 | 8/1968 | France . |
| 2535669 | 5/1984 | France . |
| 2640221 | 6/1990 | France . |

Primary Examiner—Richard M. Lorence
Assistant Examiner—Benjamin Levi
Attorney, Agent, or Firm—William H. Eilberg

[57] ABSTRACT

An operating lever assembly is provided for attachment to a bicycle handlebar which itself includes a pair of end grips. The lever assembly comprises a mount bracket fixable to the handlebar, and an operating lever pivotally connected to the mount bracket. The mount bracket is formed with an auxiliary grip which is usable for manual gripping in addition to the handlebar end grips, thereby enabling the rider to selectively assume at least two different riding postures.

14 Claims, 8 Drawing Sheets

BICYCLE OPERATING LEVER ASSEMBLY

BACKGROUND OF THE INVENTION

1. Field of the Invention

This invention relates to a bicycle operating lever assembly for attachment to a handlebar. The invention also relates to a combination of a handlebar and paired operating lever assemblies.

The term "operating lever assembly" as used herein means any lever assembly, such as brake lever assembly or speed change lever assembly, which includes a mount bracket for mounting an operating lever to a bicycle handlebar.

2. Description of the Prior Art

Various types of handlebars are known. One typical example is a drop-type handlebar which includes a straight intermediate portion and a pair of generally U-shaped drop portions at both ends of the intermediate portion, the respective drop portions providing end grips for the rider. Another example is a straight-type handlebar whose both ends provide end grips.

The drop-type handlebar enables the rider to assume at least two riding postures. Specifically, in a first riding posture, the rider grasps the end grips (drop portions) of the handlebar to forwardly incline his (or her) torso, thereby reducing aerodynamic resistance to enable high-speed running. In a second riding posture, the rider holds the handlebar intermediate portion with his (or her) torso held generally upright to enable running in a relaxed condition.

With the drop-type handlebar, the rider selects between the two possible riding postures depending on various conditions (e.g. road conditions and rider's physical conditions). Generally, the first or forwardly inclined riding posture, though enabling high-speed running, is physically exhausting for the rider because the rider's arms must support a considerable portion of the torso weight. It then becomes necessary for the rider to assume another forwardly inclined posture which enables high-speed running without arm exhaustion. Such a necessity is particularly remarkable in a triathlon wherein high-speed cycling must follow swimming which is extremely exhaustive for the rider's arms.

U.S. Pat. No. 4,750,754 to Lennon proposes a special drop-type handlebar which includes a pair of drop portions respectively having integral extensions projecting forwardly to provide additional grips located in front of the handlebar straight intermediate portion. Lennon's handlebar enables the rider to assume a forwardly inclined riding posture in which the rider's forearms are rested on the handlebar straight portion while holding the additional grips, thereby realizing high-speed running with reduced arm exhaustion. However, Lennon's solution results in great departure, with respect to design, from existing drop-type handlebars as well as in undue extension of the handlebar.

Lennon also proposes an adaptor kit for an existing drop-type handlebar. Specifically, the adaptor kit includes an extension element attached to the straight portion of the existing handlebar to extend forwardly therefrom, thereby enabling the rider to assume a forwardly inclined but relaxed riding posture. This solution, though not resulting in design departure from the existing drop-type handlebar, requires a separate clamp element or mounting means for attaching the extension element to the handlebar.

On the other hand, the straight-type handlebar is widely used for mountain bicycles wherein importance is placed on steering performance rather than on ability to run at high speed. Thus, the straight-type handlebar is rendered relatively long and basically intended to be gripped only at both ends. When the rider holds the end grips of the relatively long handlebar, the rider's arms are opened to a relatively large extent because the spacing between the end grips is larger than the shoulder breadth of the rider. Such a riding posture is convenient for steering but inconvenient for exerting a large pedalling force.

Obviously, the mountain bicycle must run through hazardous areas including steep uphills and downhills, and a considerable pedalling force is often required. However, the conventional straight-type handlebar is very inconvenient for exerting a large pedalling force, as described above. Thus, it is preferable to provide additional grips which enable a new riding posture wherein the rider can exert a large pedalling force while also reliably steering the bicycle.

SUMMARY OF THE INVENTION

It is an object of the present invention to utilize a bicycle operating lever assembly for providing at least one additional riding posture, thereby enabling the rider to select an optimum riding posture depending on various conditions.

According to one aspect of the present invention, there is provided an operating lever assembly for attachment to a bicycle handlebar which itself has a pair of end grips, the lever assembly comprising: a mount bracket fixable to the handlebar; an operating lever pivotally connected to the mount bracket; and an auxiliary grip provided in addition to the end grips of the handlebar and projecting from the mount bracket to be manually grasped by a rider.

According to another aspect of the present invention, there is provided a combination of a bicycle handlebar and a pair of operating lever assemblies attached to the handlebar, the handlebar itself having a pair of end grips, each lever assembly comprising: a mount bracket fixed to the handlebar; an operating lever pivotally connected to the mount bracket; and an auxiliary grip provided in addition to the end grips of the handlebar and projecting from the mount bracket to be manually grasped by a rider.

The operating lever assembly may be a brake lever assembly or a speed change lever assembly. The mount bracket for the operating lever is also used for mounting the auxiliary grip. Thus, no separate mounting means is required for the auxiliary grip, as opposed to Lennon (U.S. Pat. No. 4,750,754) wherein an extension member as an adaptor kit is attached to the existing handlebar by means of a separate clamp member additional to the mount bracket for the brake lever.

According to the present invention, the auxiliary grip is provided in addition to the end grips of the handlebar itself. Thus, the rider can selectively assume at least two riding postures.

Basically, the present invention proposes that the operating lever assembly is attached to a handlebar which itself has a pair of end grips. Such a teaching makes a sharp contrast against the disclosure of U.S. Pat. No. 4,462,267 to Shimano. Specifically, Shimano proposes a brake lever assembly for attachment to an incomplete handlebar which has no end grips of its own. Instead, the lever assembly has a mount bracket which is integrally formed with a dropped grip portion, so that the handlebar becomes complete with the dropped grip portion only when the lever mount bracket is attached to the incomplete handlebar.

Other objects, features and advantages of the present invention will be fully understood from the following detailed description given with reference to the accompanying drawings.

DETAILED DESCRIPTION OF THE PREFERRED EMBODIMENTS

Figure 1:
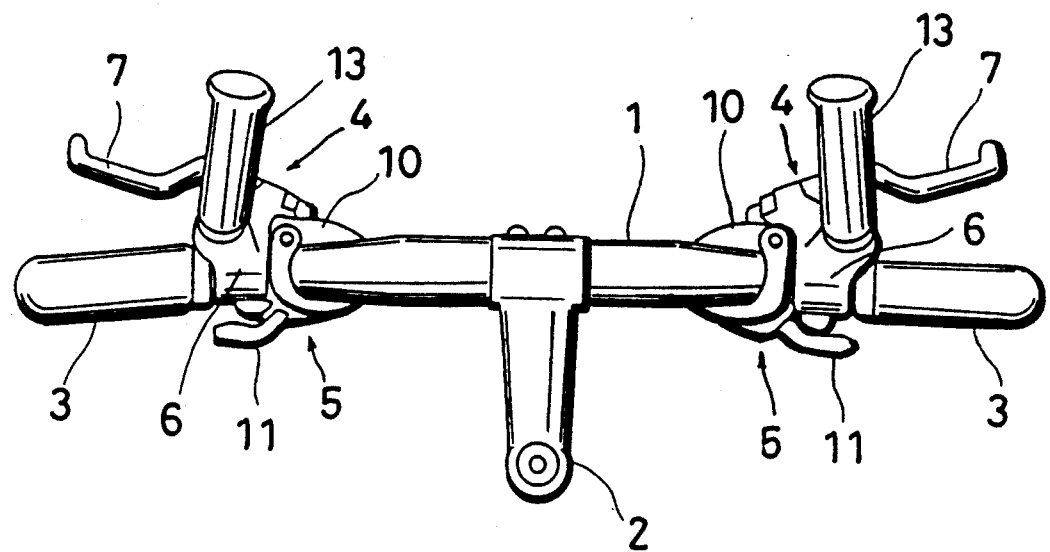
FIG. 1 is a plan view showing a combination of a handlebar and paired operating lever assemblies according to the present invention.

Throughout the accompanying drawings, identical or functionally similar parts are designated by the same reference numerals for the convenience of illustration.

Figure 2:
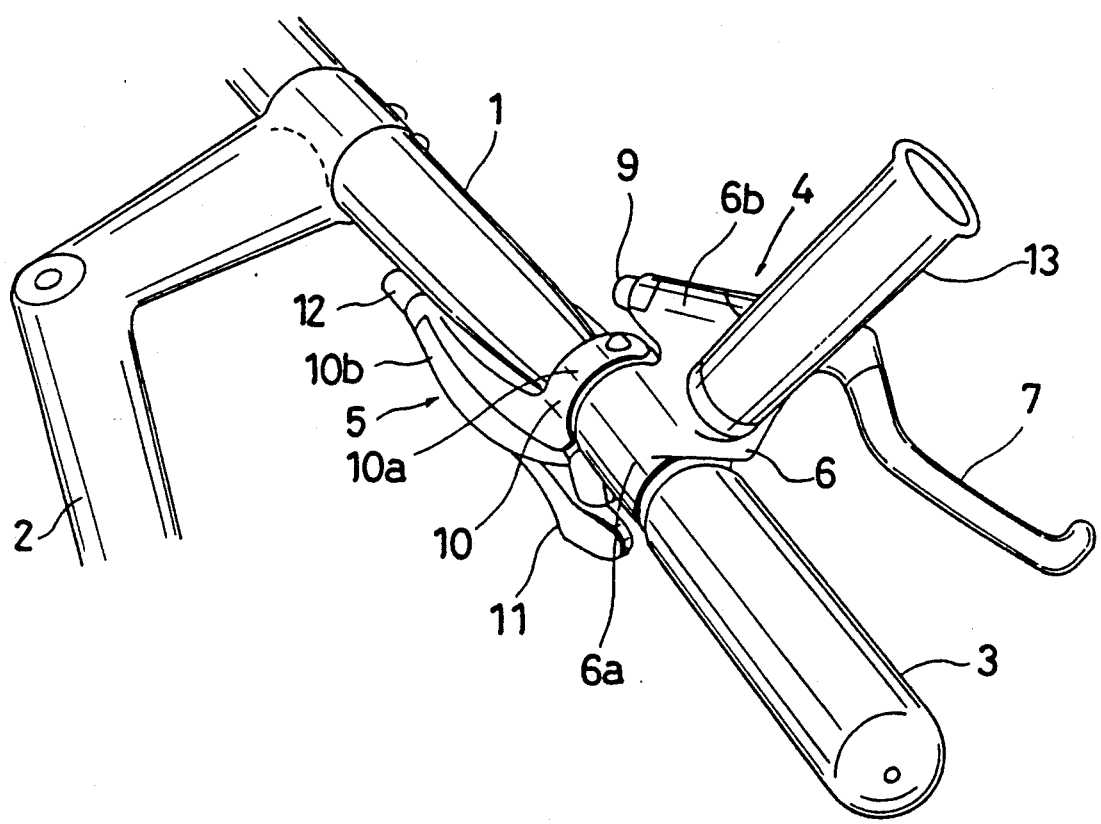
FIG. 2 is an enlarged fragmentary perspective view showing the same combination.

Referring now to FIGS. 1 and 2 of the accompanying drawings, there is illustrated a straight-type handlebar 1 which is centrally fixed to a handlebar stem 2 of a mountain bicycle. The handlebar has a pair of end grips 3 in a conventional manner.

A brake lever assembly 4 is mounted to the handlebar 1 at a position close to but laterally inwardly from each end grip 3. Further, a speed change lever assembly 5 is mounted to the handlebar at a position close to but laterally inwardly from the corresponding brake lever assembly.

Figure 3:
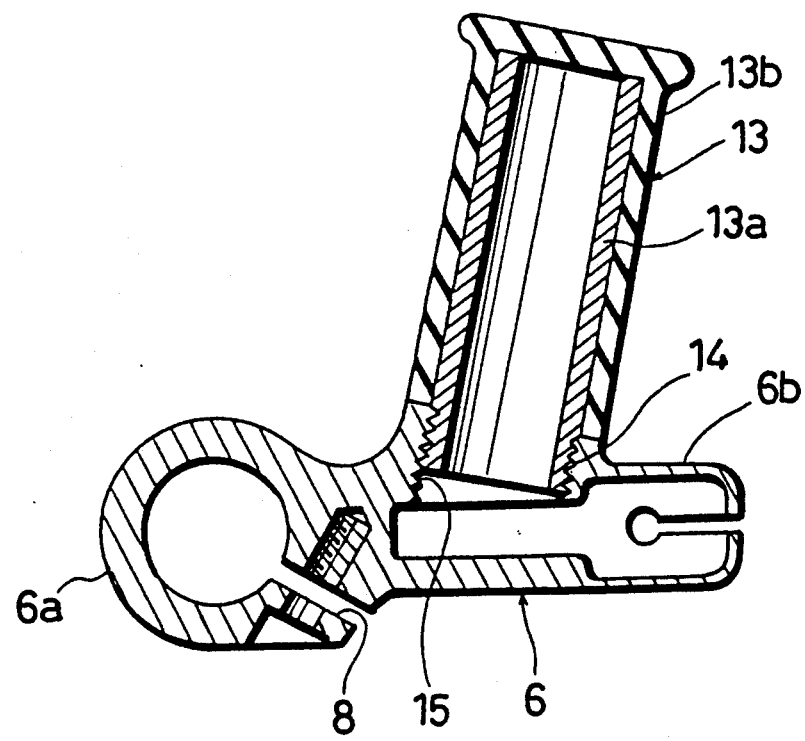
FIG. 3 is a sectional view showing how an auxiliary grip of the same combination is configured and mounted.

The brake lever assembly 4 includes a mount bracket 6 and a brake lever 7. The mount bracket has a cylindrical base portion 6a fixed to the handlebar 1, and a lever mounting portion 6b projecting forwardly from the base portion 6a, as shown in FIGS. 2 and 3. The cylindrical base portion 6a is formed with a longitudinal slit 8 to enable elastic contraction of the base portion. Thus, the mount bracket 6 may be fixedly clamped to the handlebar by a bolt (not shown) screwed into the base portion 6a transversely to the slit 8 (see FIG. 3).

The lever mounting portion 6b of the brake lever mount bracket 6 is hollow, as shown in FIG. 3. The brake lever 7 is pivotally pinned to the lever mounting portion 6b. A sheath connector is provided on the lever mounting portion 6b for connection to the outer sheath of a double-type brake control cable (not shown). The inner wire of the brake control cable is introduced into the lever mounting portion for direct connection to the brake lever.

The speed change lever assembly 5 includes a mount bracket 10 and a speed change lever 11. As shown in FIG. 2, the mount bracket 10 has a split base ring 10 fixedly clamped to the handlebar 1 by means of a bolt (not shown), and a lever mounting portion 10b for pivotally supporting the speed change lever 11. The lever mounting portion 10b is provided with a sheath connector 12 for connection to the outer sheath of a double-type derailleur control cable (not shown) whose inner wire is directly connected to the speed change lever.

According to the illustrated embodiment, the mount bracket 6 of the brake lever assembly 4 is provided with an auxiliary grip 13 which projects upwardly but is inclined slightly forwardly, as best shown in FIG. 3. The auxiliary grip 13 includes a cylindrical core 13a and an outer cover 13b which is made of rubber for example. The core 13a has an externally threaded lower end 14, whereas the brake lever mount bracket is formed with an internally threaded bore 15 for removable engagement with the core.

Figure 4:
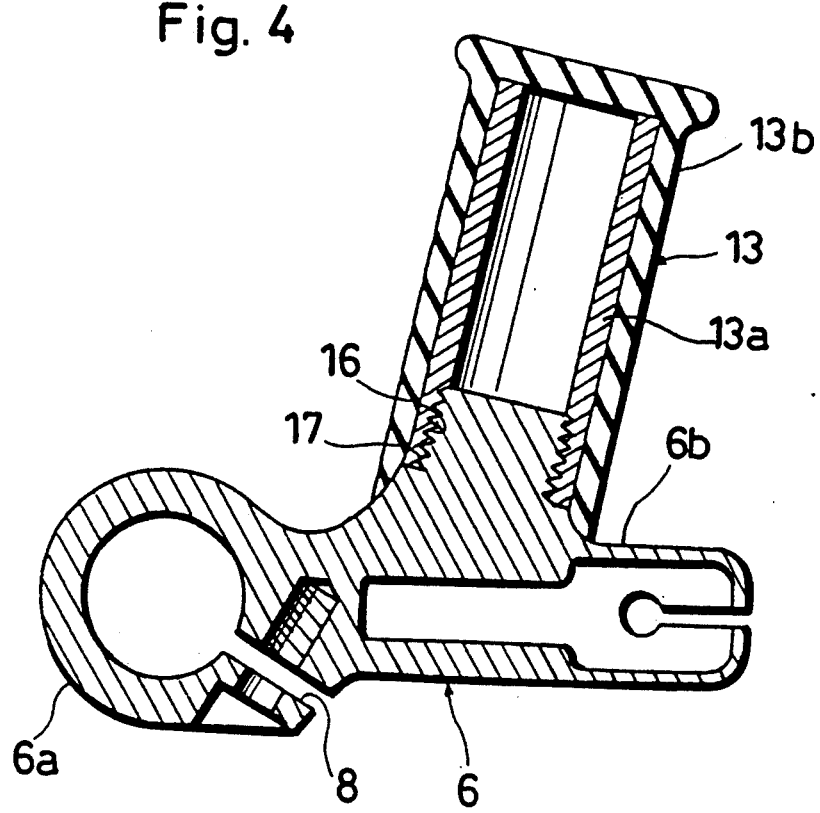
FIG. 4 is a sectional view similar to FIG. 3 but showing an alternative arrangement for the auxiliary grip.
Figure 5:
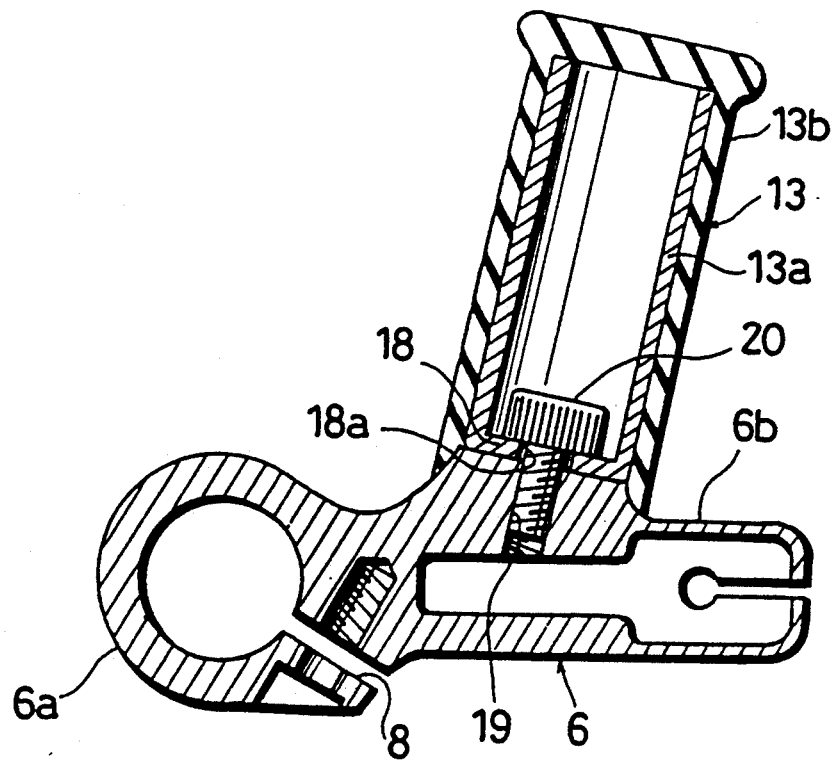
FIG. 5 is a sectional view also similar to FIG. 3 but showing another alternative arrangement for the auxiliary grip.

Alternatively, the cylindrical core 13a of the auxiliary grip 13 may be made to have an internally threaded lower end 16, whereas the brake lever mount bracket 6 is formed with an externally threaded projection 17 for removable engagement with the core, as shown in FIG. 4. Further alternatively, the core 13a of the auxiliary grip 13 may be made to have a bottom wall 18 formed with a perforation 18a for insertion of a fixing bolt 20 into engagement with an internally threaded bore 19 formed in the brake lever mount bracket 6, as shown in FIG. 5.

As illustrated, the auxiliary grip 13 is provided to project upward directly from the brake lever mount bracket 6, so that the presence of the auxiliary grip at an intermediate portion of the handlebar 1 does not hinder operation of the brake lever 7 and speed change lever 11. Further, since the auxiliary grip forms a part of the brake lever assembly 4, no separate mount bracket is required for mounting the auxiliary grip onto the handlebar. In other words, the single mount bracket 6 is commonly utilized for mounting the brake lever 7 and the auxiliary grip 13.

With the arrangement described above, the rider can assume at least two riding postures. Specifically, in a first riding posture, the rider holds each end grip 3 of the handlebar 1. In this first riding posture, the rider's fingers are readily available for operating the brake lever 7. In a second riding posture, on the other hand, the rider grasps each auxiliary grip 13. In this second riding posture, the rider's fingers are still available for operating the brake lever, thereby insuring safety.

The spacing between the two auxiliary grips 13 (i.e., the spacing between the two brake lever mount brackets 6) is generally equal to the shoulder breadth of the rider. Thus, in the second riding posture holding the auxiliary grips 13, the rider's arms can be oriented or extended in a natural fashion for conveniently steering the bicycle. Further, in climbing up a slope or accelerating the bicycle with the second riding posture, the rider can conveniently shift his (or her) weight forward by pulling the torso toward the handlebar 1 (i.e., the auxiliary grips 13) without laterally directing the elbows. In this way, the auxiliary grips 13 contribute greatly to improvement in steering controllability and running performance of the bicycle (mountain bicycle in particular).

Moreover, since each auxiliary grip 13 is located laterally inwardly from the corresponding end grip 3 of the handlebar 1, the following additional advantages are also obtainable. First, when the bicycle falls sidewise during running, it is the end grip 3 or brake lever 7 that first comes into direct contact with the ground. Thus, the rider's hand holding the auxiliary grip 13 is protected from being injured. Secondly, due to the location intermediately of the handlebar 1, the auxiliary grip 13 is unlikely to come into unexpected contact to tree branches or other obstacles when running in mountain areas or other hazardous areas.

Figure 11:
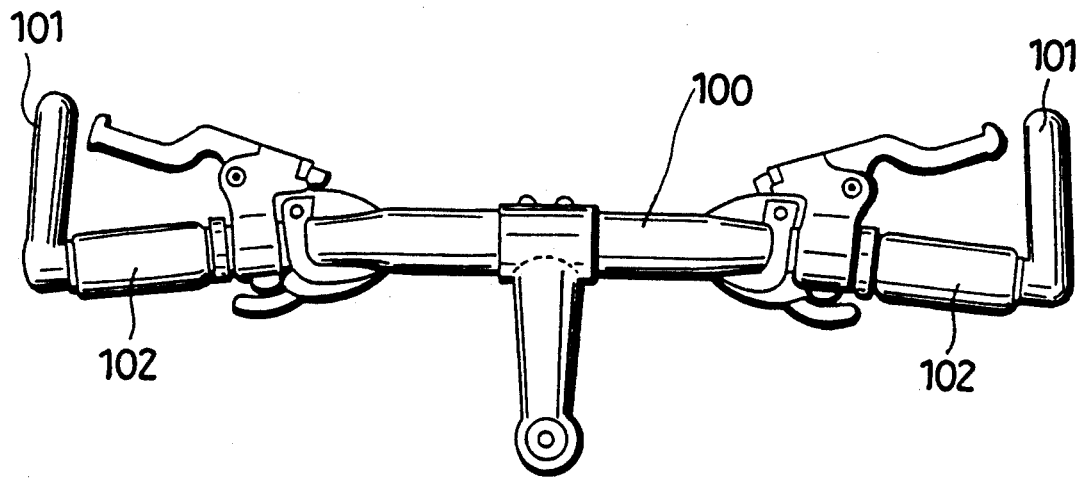
FIG. 11 is a plan view showing a prior art straight-type handlebar with operating lever assemblies.

By contrast, as shown in FIG. 11, if a straight-type handlebar 100 is integrally formed with a pair of upwardly projecting auxiliary grips 101 each at a position laterally outwardly from a corresponding end grip 102, the following problems will result. First, due to the finger orientation, it is very difficult for the rider to operate the brakes while holding the auxiliary grips 101. Secondly, the rider must unduly expand or open his (or her) arms for holding the auxiliary grips 101, thereby leading to an unnatural riding posture which is very inconvenient for manipulating the handlebar 1 and for shifting the rider's weight forward (as required for accelerating or climbing up a slope). In the third place, due to the location laterally outwardly from the end grips 102 of the handlebar 100, the auxiliary grips 101 are likely to come into accidental contact with tree branches or other obstacles in running hazardous areas, and the rider's hands holding the auxiliary grips 101 may be immediately injured when the bicycle falls down laterally.

Figure 6:
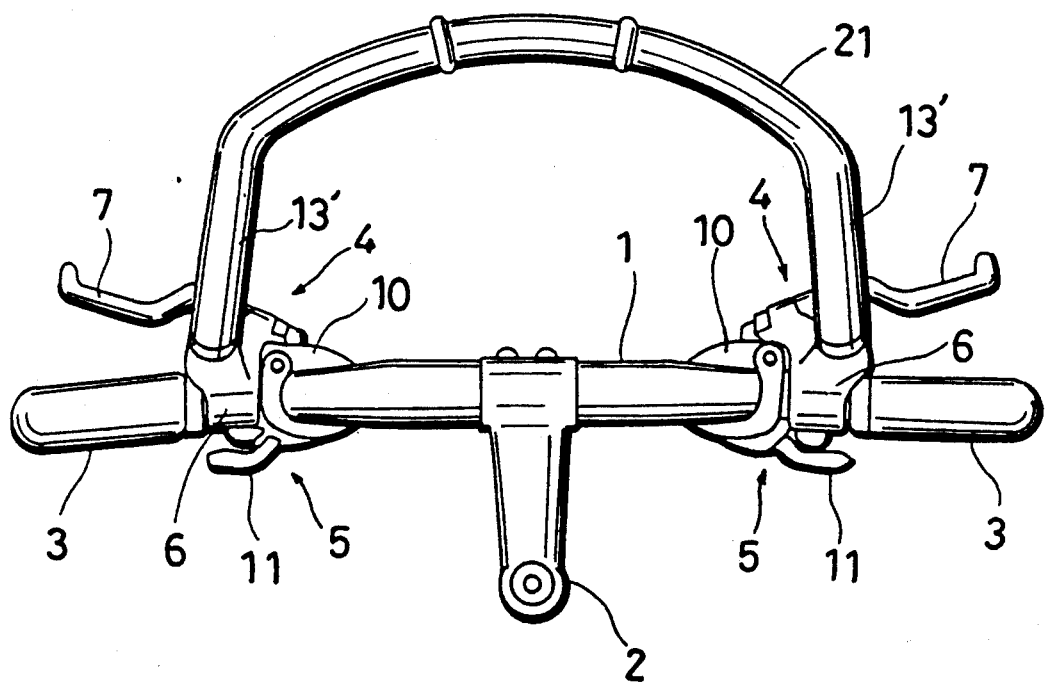
FIG. 6 is a plan view showing a modification of the combination shown in FIG. 1.

FIG. 6 shows a modified embodiment of the present invention which differs from the embodiment of FIGS. 1 to 3 only in one respect. Specifically, each brake lever assembly 4 incorporates an upwardly projecting auxiliary grip 13' which is rendered substantially integral with the auxiliary grip of the other brake lever assembly by means of a connector portion 21. This connector portion extends generally arcuately above and before the handlebar 1. Thus, a complete loop is formed by the combination of the handlebar 1, the two auxiliary grips 13' and the connector portion 21.

The modification of FIG. 6 provides the same advantages as already described in connection with the embodiment of FIGS. 1 to 3. Further, the connector portion 21 provides additional gripping positions for the rider, thereby enabling additional riding postures.

The embodiments described above may be further modified so that the auxiliary grips 13 (or 13') are provided to project upward from the respective speed change lever mount brackets 10 instead of the brake lever mount brackets 11. Alternatively, each auxiliary grip may be made to project upward from a common mount bracket (not shown) which is used for pivotally mounting both of the brake lever 7 and the speed change lever 11. Further, the upwardly projecting auxiliary grip combined with the operating lever assembly (the brake lever assembly or the speed change lever assembly) may be provided on a different type of handlebar such as a drop-type handlebar.

Figure 7:
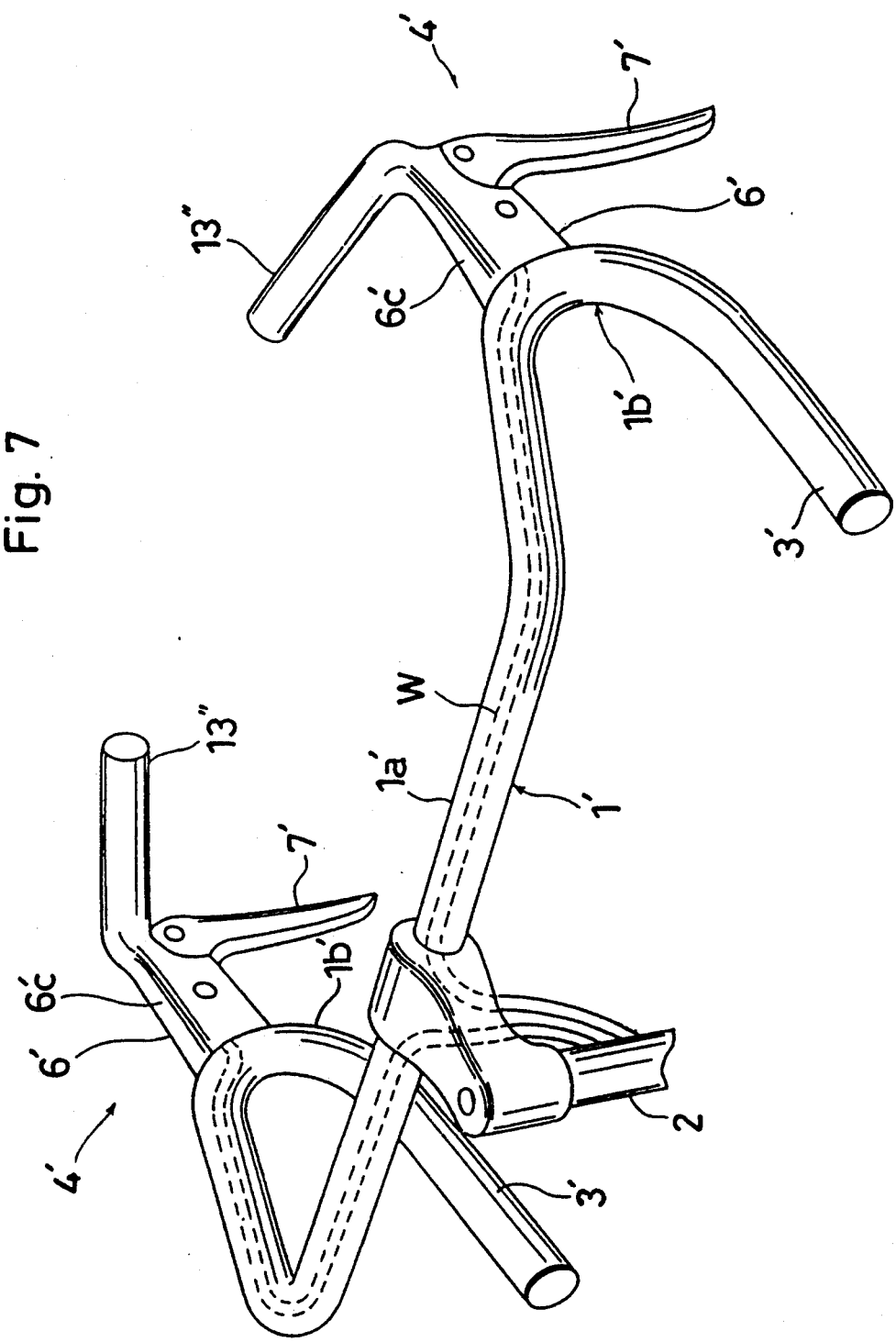
FIG. 7 is a perspective view showing another combination of a handlebar and paired operating lever assembly.
Figure 8:
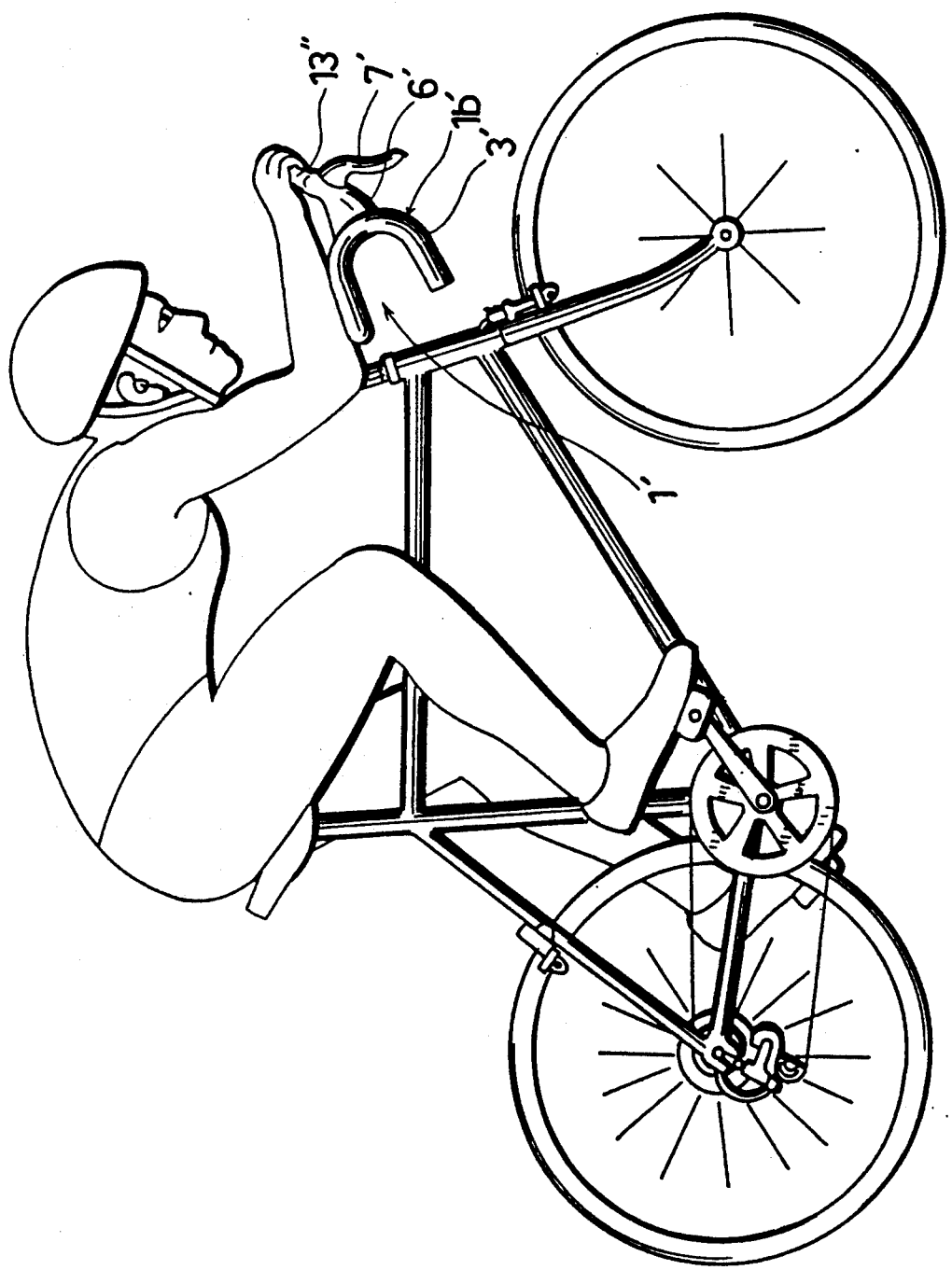
FIG. 8 is a side view of a bicycle incorporating the combination shown in FIG. 7 to illustrate how such a combination is used.
Figure 9:
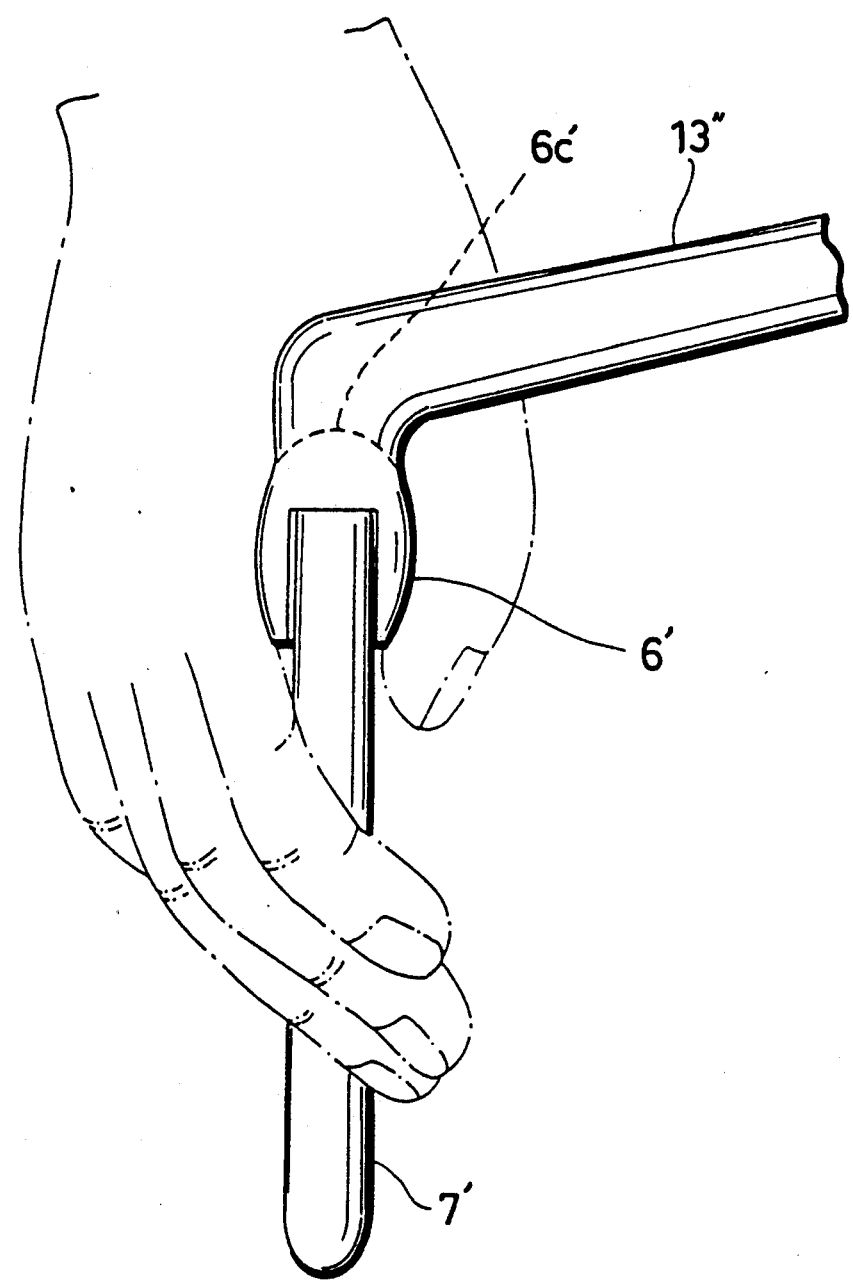
FIG. 9 is a fragmentary front view showing another use of the combination shown in FIG. 7.

FIGS. 7 through 9 show a further embodiment of the present invention which is applied to a drop-type handlebar 1'. In a conventional manner, the drop-type handlebar includes a straight intermediate portion 1a' centrally fixed to a handlebar stem 2, and a pair of generally U-shaped drop portions 1b' at both ends of the straight portion 1a'. The respective drop portions 1b' provide end grips 3'.

A brake lever assembly 4' is attached to each drop portion 1b' of the handlebar 1'. The brake lever assembly includes a mount bracket 6' fixed at its base end to the handlebar in a conventional manner by an unillustrated clamp band to project forward from the drop portion. The lever assembly further includes a brake lever 7' extending downward from the mount bracket and pivotally pinned thereto.

In FIG. 7, a double-type brake control cable W is shown to extend within the interior space of the handlebar 1'. The control cable is introduced into the brake lever mount bracket 6' from behind. The outer sheath of the control cable is caught by a fixed part (not shown) of the mount bracket, whereas the inner wire of the control cable is connected to the brake lever 7'. Thus, the mount bracket is substantially unobstructed by the control cable to be gripped by the rider. The upper surface 6c' of the mount bracket works as a palm rest for the rider at the time of gripping the mount bracket.

According to the present invention, the brake lever mount bracket 6' is integrally formed, at its forward end, with an auxiliary grip 13" which extends laterally inwardly and slightly upwardly toward the center of the handlebar 1'. Thus, the auxiliary grip 13" is located in front of the straight portion 1a' of the handlebar. Obviously, the auxiliary grip may be separate from the mount bracket and removably attached thereto by screwing for example.

With the arrangement described above, the rider can take various riding postures. Specifically, the rider can assume a first riding posture in which the rider grasps the respective end grips 3' of the handlebar 1'. In a second riding posture, the rider rests his (or her) forearms on the handlebar straight portion 1a' while holding the respective auxiliary grips 13" of the two brake lever assemblies, as shown in FIG. 8. In a third riding posture, the rider grips the brake lever mount bracket 6' while resting his (or her) palm on the palm resting upper surface 6c' of the mount bracket, as shown in FIG. 9. If desired, the rider can also assume a fourth riding posture (generally upright riding posture) wherein the rider grips the handlebar straight portion 1a'.

Obviously, the second riding posture shown in FIG. 8 is much more relaxing than the first riding posture (holding the handlebar end grips 3') because the rider's forearms can be rested on the handlebar 1'. Nevertheless, the second riding posture causes the rider's torso to be forwardly inclined to a great extent, thereby minimizing the aerodynamic resistance to enable high-speed running. Thus, the second riding posture is particularly advantageous when the rider wants to remove or avoid arm exhaustion while realizing high-speed running.

In the third riding posture shown in FIG. 9, use is made of the brake lever mount bracket 6' itself instead of a separate grip. In such a riding posture, the brake lever 7' may be operated immediately because the rider's fingers may be held engaged with the brake lever. At the time of braking, on the other hand, a forward inertial force tends to slip the rider's hand off the mount bracket. However, the auxiliary grip 13' comes into stopping engagement with the rider's thumb to prevent the rider's hand from slipping off the mount bracket. Thus, the auxiliary grip works as a hand stopper which is effective for increasing running safety in the third riding posture.

Figure 10:
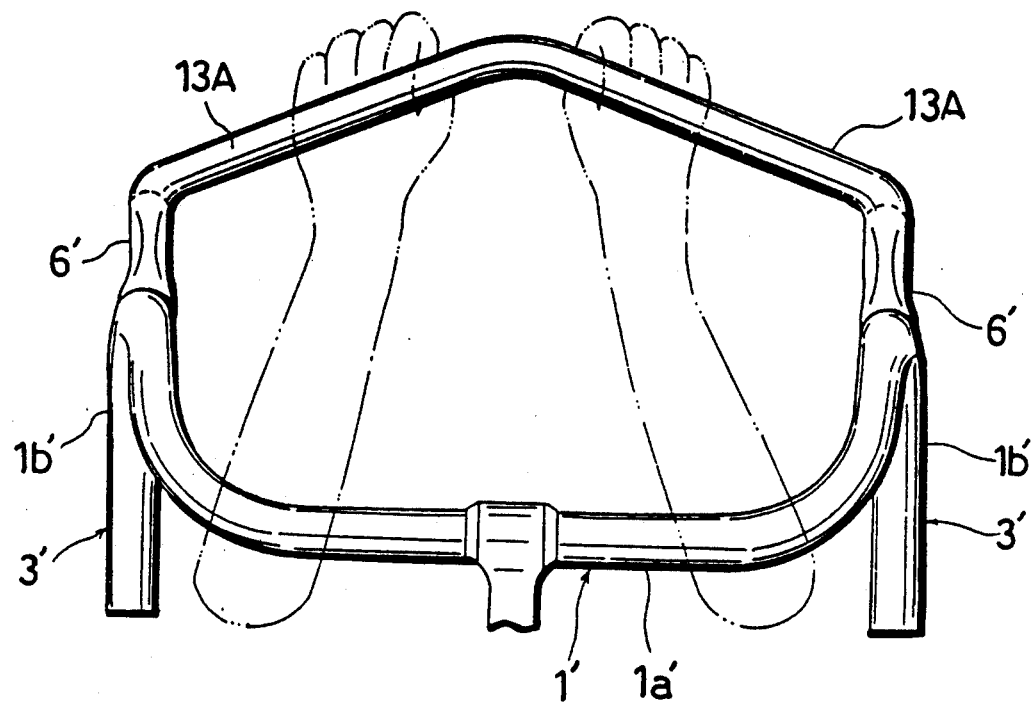
FIG. 10 is a plan view showing a modification of the combination shown in FIG. 7.

FIG. 10 shows a modification which differs from the embodiment of FIGS. 7 through 9 only in that each brake lever mount bracket 6' has an auxiliary grip 13A which is extended enough to integrally merge with the auxiliary grip of the other brake lever mount bracket. Thus, a loop is formed by the auxiliary grips 13A, the brake lever mount bracket 6' and the handlebar 1'.

According to the modification of FIG. 10, the rider can grasp various portions of the respective auxiliary grips 13A depending on the forearm length of the rider or the running conditions.

The invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

We claim:

1. An operating lever assembly for attachment to a bicycle handlebar which itself has a pair of end grips, the lever assembly comprising:
   a mount bracket separate from but fixable to the handlebar;
   an operating lever pivotally connected to the mount bracket; and
   an auxiliary grip provided in addition to the end grips of the handlebar and projecting directly from the mount bracket, the auxiliary grip comprising a hand grip capable of being gripped by a rider's full hand as an independent alternative to the end grips, the auxiliary grip not forming part of the handlebar,
   wherein the operating lever extends laterally outward from the mount bracket, and the auxiliary grip projects upward from the mount bracket.

2. The lever assembly according to claim 1, wherein the operating lever is a brake lever, and the mount bracket is used for mounting the brake lever.

3. The lever assembly according to claim 1, wherein the auxiliary grip is removably fixed to the mount bracket.

4. The lever assembly according to claim 3, wherein the auxiliary grip has a first threaded portion, and the mount bracket has a second threaded portion for engagement with the first threaded portion.

5. The lever assembly according to claim 3, wherein the auxiliary grip is fixed to the mount bracket by a bolt engaging into the mount bracket.

6. The lever assembly according to claim 1, wherein the auxiliary grip has a core member provided with an outer cover.

7. The lever assembly according to claim 1, wherein the auxiliary grip is connected to an auxiliary grip of another operating lever assembly.

8. An operating lever assembly for attachment to a bicycle handlebar which itself has a pair of end grips, the lever assembly comprising:
   a mount bracket separate from but fixable to the handlebar;
   an operating lever pivotally connected to the mount bracket; and
   an auxiliary grip provided in addition to the end grips of the handlebar and projecting directly from the mount bracket, the auxiliary grip comprising a hand grip capable of being gripped by a rider's full hand as an independent alternative to the end grips, the auxiliary grip not forming part of the handlebar,
   wherein the operating lever is a brake lever, and the mount bracket is used for mounting the brake lever, and
   wherein the brake lever extends downward from the mount bracket, and the auxiliary grip projects laterally inward from the mount bracket.

9. The lever assembly according to claim 8, wherein the mount bracket has a palm resting upper surface.

10. The lever assembly according to claim 8, wherein the auxiliary grip is integral with the mount bracket.

11. In combination, a bicycle handlebar and a pair of operating lever assemblies attached to the handlebar, the handlebar itself having a pair of end grips, each lever assembly comprising:
    a mount bracket separate from but fixed to the handlebar;
    an operating lever pivotally connected to the mount bracket; and
    an auxiliary grip provided in addition to the end grips of the handlebar and projecting directly from the mount bracket, the auxiliary grip comprising a hand grip capable of being gripped by a rider's full hand as an independent alternative to the end grips, the auxiliary grip not forming part of the handlebar, and
    wherein the handlebar is generally straight, and the mount bracket is attached to the handlebar at a position laterally inwardly from a corresponding end grip of the handlebar, the operating lever extending generally horizontally from the mount bracket, the auxiliary grip projecting upward from the mount bracket.

12. In combination, a bicycle handlebar and a pair of operating lever assemblies attached to the handlebar, the handlebar itself having a pair of end grips, each lever assembly comprising:
    a mount bracket separate from but fixed to the handlebar;
    an operating lever pivotally connected to the mount bracket; and
    an auxiliary grip provided in addition to the end grips of the handlebar and projecting directly from the mount bracket, the auxiliary grip comprising a hand grip capable of being gripped by a rider's full hand as an independent alternative to the end grips, the auxiliary grip not forming part of the handlebar, and
    wherein the handlebar is drop-type handlebar which has an intermediate straight portion and a pair of generally U-shaped drop portions at both ends of the straight portion, the mount bracket being attached to a corresponding drop portion of the handlebar, the operating lever being a brake lever extending downward from the mount bracket, the auxiliary grip extending laterally inward from the mount bracket.

13. The combination according to claim 12, wherein the mount bracket has a palm resting upper surface, the auxiliary grip also serving as a hand stopper engageable with the rider's thumb when the rider grips the mount bracket.

14. The combination according to claim 12, wherein the auxiliary grip of one lever assembly is connected to the auxiliary grip of the other lever assembly.

* * * * *